United States Patent [19]
Lutz et al.

[11] Patent Number: 4,791,664
[45] Date of Patent: Dec. 13, 1988

[54] SYSTEM FOR SELECTIVELY RECEIVING TELEPHONE CALLS

[76] Inventors: Joseph M. Lutz, 200 St. Andrews Blvd., Apt. 3505, Winter Park, Fla. 32792; Siegfried G. Hitzler, 206 Skillman Ave., Brooklyn, N.Y. 11211

[21] Appl. No.: 906,395

[22] Filed: Sep. 12, 1986

[51] Int. Cl.⁴ .............................................. H04M 1/00
[52] U.S. Cl. .................................... 379/199; 379/188; 379/387
[58] Field of Search ................ 379/199, 200, 188, 387

[56] References Cited

U.S. PATENT DOCUMENTS

| | | | |
|---|---|---|---|
| 3,784,721 | 1/1974 | Kilby | 379/201 X |
| 3,829,616 | 8/1974 | Blouch | 379/188 |
| 3,902,016 | 8/1975 | Blouch | 379/102 |
| 4,006,316 | 2/1977 | Bolgiano | 379/199 X |
| 4,074,078 | 2/1978 | Jansen | 379/199 |
| 4,446,334 | 5/1984 | Groff | 379/188 |

*Primary Examiner*—James L. Dwyer
*Attorney, Agent, or Firm*—Birch, Stewart, Kolasch & Birch

[57] ABSTRACT

A system for selectively receiving incoming telephone calls to a phoneset includes an automatic answering device which answers all incoming calls by placing a simulated phone load across the phone lines. The answering device also enables a dual tone multifrequency (DTMF) receiver to receive tone frequencies input by a caller. The DTMF receiver decodes the tone pulses into binary coded decimal values which are stored in successive storage registers. A comparator compares the values stored in the registers with a respective code input by the subscriber and outputs a signal when the code dialed in by the caller matches the code input by the subscriber. The signal activates an electronic ringer circuit which serves to alert the subscriber of the presence of an authorized call. An off-hook detector detects the pick-up of a phoneset by the subscriber and acts to disable the electronic ringer circuit. Upon the placing of the phoneset back into its cradle, the off-hook detector activates an automatic reset circuit which resets the automatic answering device as well as the code storage registers.

10 Claims, 5 Drawing Sheets

SYSTEM FOR SELECTIVELY RECEIVING TELEPHONE CALLS

BACKGROUND OF THE INVENTION

This invention relates generally to systems for attachment to a subscriber's telephone, and more particularly to systems for intercepting incoming telephone calls and allowing only those calls authorized by the subscriber to be put through to the subscriber's telephone set.

Annoyance telephone calls are a common everyday experience in modern society. Salesmen, solicitors and others often call at inconvenient times such as the dinner hour or late at night when they know a subscriber will be at home. Most people would prefer not to receive such calls, however, because of the possibility that an incoming call may be of an emergency nature or may be an important message, the incoming call must be answered.

In order to reduce the number of unsolicited telephone calls, many people have requested unlisted telephone numbers. However, this results in increased costs to the telephone subscriber, while not being totally effective in preventing the reception of unwanted and annoying telephone calls. This is because solicitors and others can usually find out the telephone number of a subscriber through various means including the use of certain automatic sequential dialing machines.

SUMMARY OF THE INVENTION

It is thus an object of the present invention to eliminate the need for an unpublished or unlisted telephone number.

It is a further object of the present invention to preclude the reception by a subscriber of unwanted and annoying telephone calls.

It is a still further object of the present invention to provide a system for selectively receiving incoming telephone calls by allowing a subscriber to select a numeral code which must be dialed by an outside caller in order for the system to indicate the presence of an incoming telephone call to the subscriber.

The objects of the present invention are fulfilled by providing a system for selectively receiving incoming telephone calls comprising tone decoder means responsive to an incoming tone pulse for outputting a binary coded decimal value corresponding to the frequency of the incoming tone pulse, code selector means for sequentially storing a plurality of binary coded decimal values that are input by a subscriber and comparator means responsive to the code selector means and the binary coded decimal values output by the tone decoder means for comparing the respective values and providing an output signal when the respective values are equal, and ringer means responsive to said output signal from said comparator means for alerting a subscriber of the presence of an authorized incoming call.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
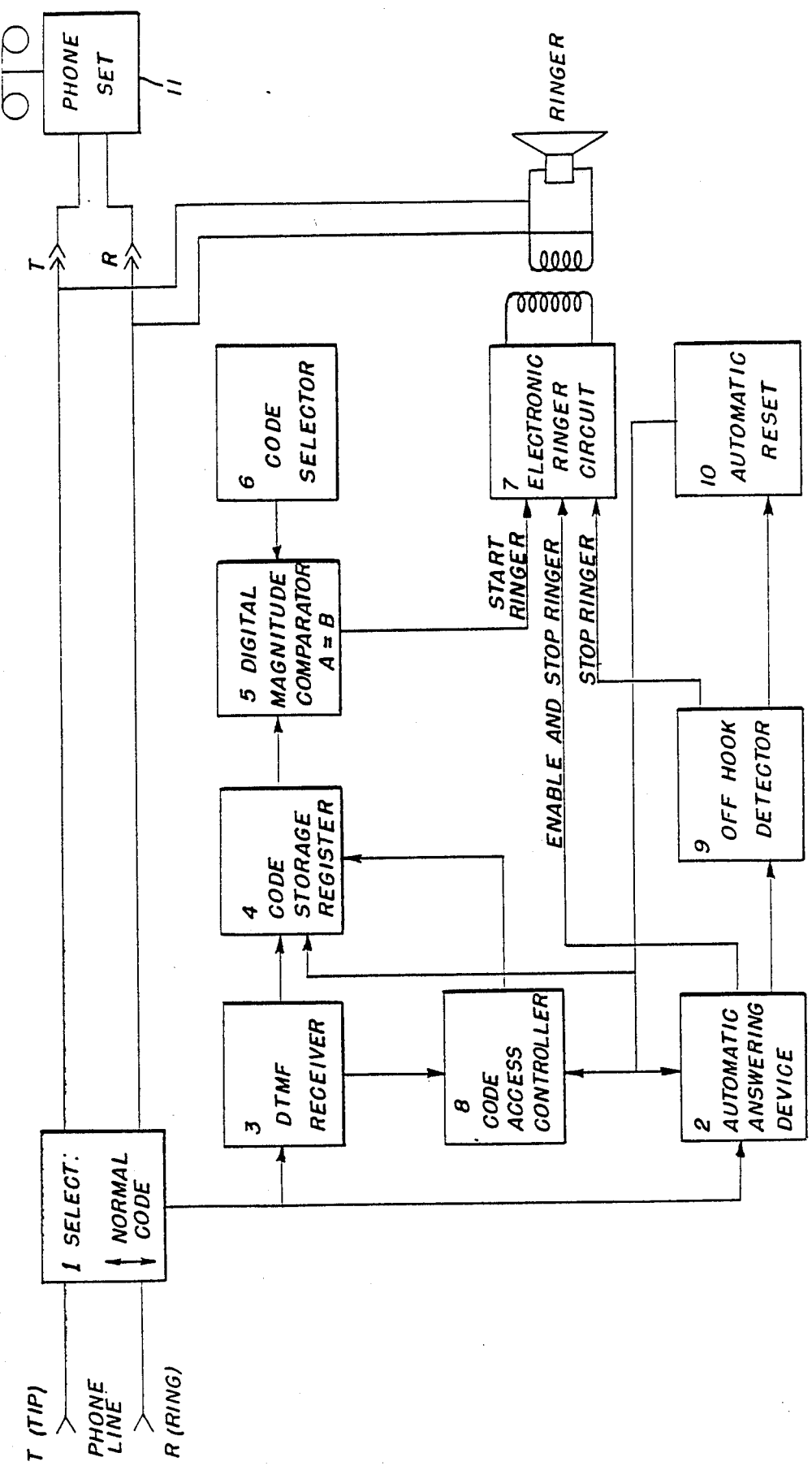
FIG. 1 is a block diagram of one preferred embodiment of the present invention.

FIG. 1 is a block diagram illustrating the basic concept of a preferred embodiment of the present invention wherein element 1 is a mode select circuit for selecting either a normal mode wherein the phone set 11 is directly connected to the phone lines T and R, or a coded mode in which the phone line is routed to an automatic answering device 2 which answers an incoming call by placing a simulated telephone load across the phone lines and enables a DTMF receiver 3 and electronic ringer circuit 7 for alerting a subscriber of the presence of an authorized telephone call. After the call has been answered by the automatic answering device 2, the device sends back a confirmation tone to indicate that a coded phone set has been reached, then the outside caller sequentially dials a three digit code using a standard touchtone system, which digits are detected by DTMF receiver 3 and are decoded to output a binary coded decimal value into a code register 4, which register is controlled by code access controller 8 in conjunction with the signals received by the DTMF receiver 3.

A specific three digit code selected by the subscriber using code selector 6 is compared with the three digits dialed in by the outside caller using a digital magnitude comparator 5. When the three digit code dialed in by an outside caller matches the code input by the subscriber, digital magnitude comparator 5 provides an output signal to the electronic ringer circuit 7 which starts the ringer circuit ringing to alert the subscriber of the presence of an authorized call. As the subscriber picks up the phone set, off-hook detector 9 senses that the phone set has been picked up, and sends a disable signal to the electronic ringer circuit 7 in order to terminate the audible ringing of the ringer circuit.

Upon the completion of a conversation, and the replacing of the phone handset into its cradle, off-hook detector 9 sends a signal to the automatic reset circuit 10 which resets the automatic answering device 2 as well as code access controller 8 and code storage register 4 to place them in a standby mode for the next incoming call.

The various circuit elements of the present invention as illustrated in FIG. 1 will now be described with reference to FIGS. 2-4.

Figure 2:
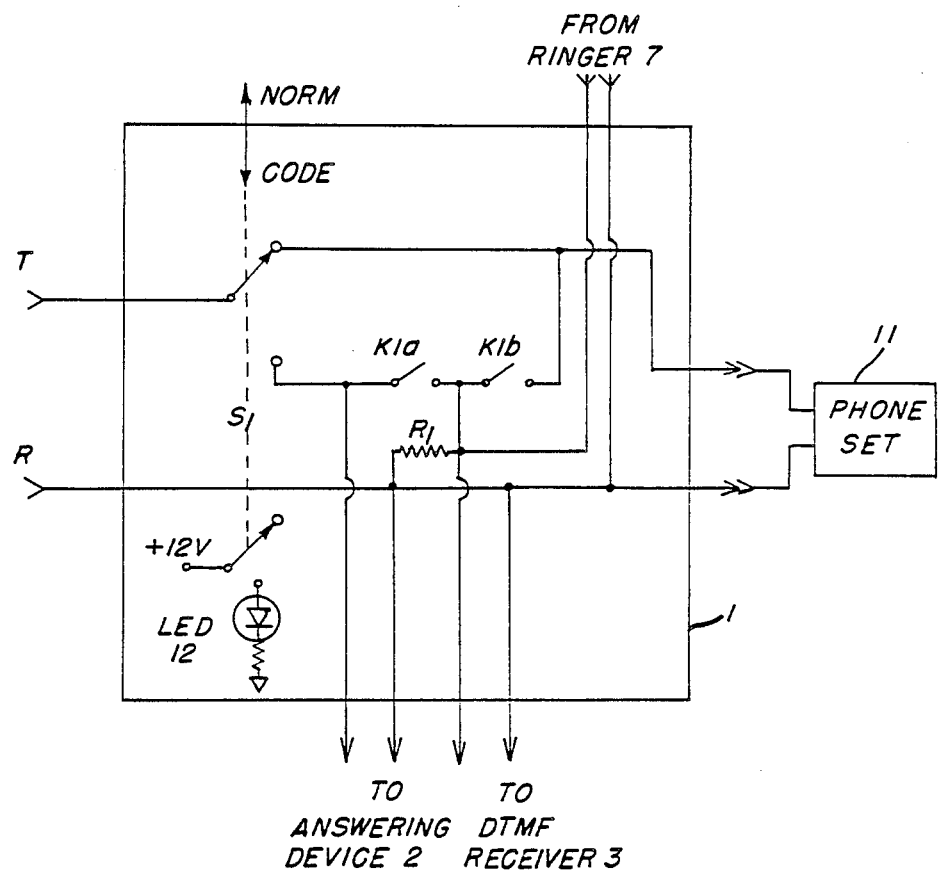
FIG. 2 is a schematic diagram of the select circuit 1 of FIG. 1.

As shown in FIG. 2, the mode select switch circuit 1 contains a manual selector switch S1, which disconnects the phone line from the telephone set and connects it to the automatic answering device 2 when the switch S1 is placed in the code mode by the subscriber. When switch S1 is placed in the normal mode, as shown in FIG. 2, the phone set 11 is directly connected to the telephone line and will receive any and all incoming calls. An LED 12 is provided to indicate when the system is in the coded mode via a ganged switch connected to S1.

Figure 3:
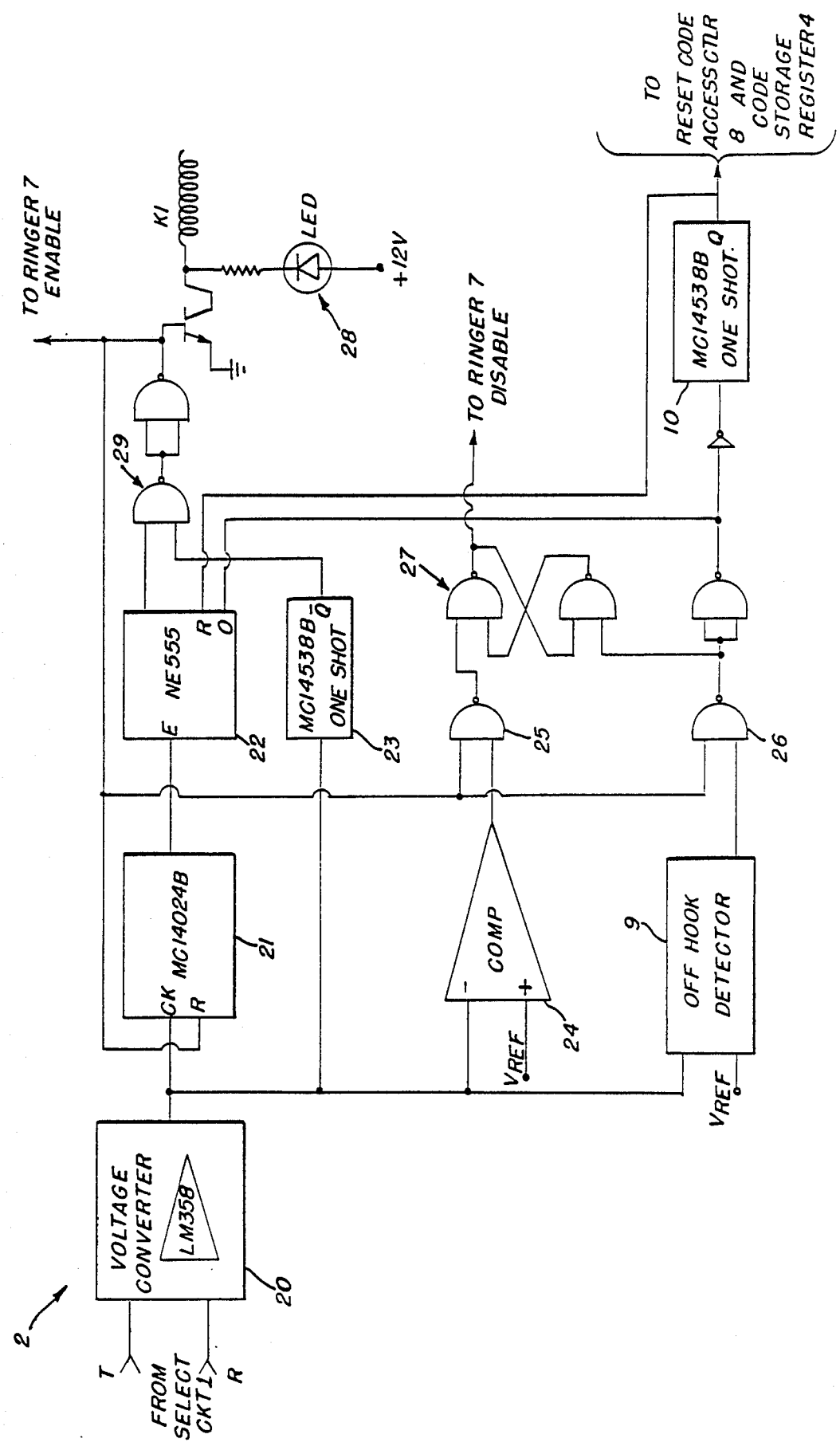
FIG. 3 is a simplified schematic diagram of the automatic answering device 2, off-hook detector 9, and automatic reset circuit 10 of FIG. 1.

Referring to FIG. 3, the automatic answering device 2 comprises a voltage converter 20 coprising a standard differential amplifier LM 358 which converts the standard −48 volt central telephone office voltage into a +12 volt DC level which is the positive logic level of the present system. The output of voltage converter 20 is simultaneously connected to a 7 bit binary counter 21, a voltage comparator 24, off-hook detector circuit 9, and a retriggerable one-shot device or monostable multivibrator 23. The output of 7 bit binary counter 21 is connected to a 555 timer 22, whose output is consequently connected to a NAND gate. The one-shot circuit 23 provides the other input to the NAND gate connected to the 555 timer.

Figure 5:
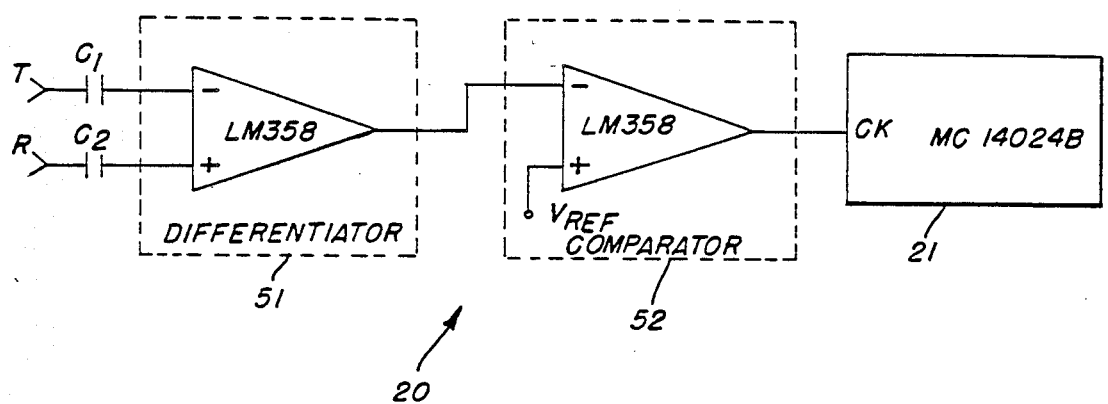
FIG. 5 is a simplified schematic diagram of an alternate embodiment of the voltage converter 20 of FIG. 3.

FIG. 5 shows an alternate embodiment of the voltage converter 20 of FIG. 3 in which the converter is replaced by a differentiator circuit 51 capacitively coupled to the phone lines via capacitors $C_1$ and $C_2$ and a comparator circuit 52 having an input connected to the output of the differentiator 51.

A survey has shown that a significant number of residential phonesets are connected with the tip (T) and ring (R) lines reversed. If this situation remains uncorrected, the automatic answering device will not function properly. Consequently, the voltage converter 20 may be replaced by a capacitively coupled differentiator circuit 51 which is responsive to voltage peaks in either direction. Comparator 52 converts these peaks into square wave signals that are applied to counter 21. In this way, the automatic answering device will operate correctly independent of the tip and ring line connections.

The output of voltage comparator 24 is connected to a further NAND gate 25 and the output of off-hook detector 9 is connected to a NAND gate 26. The other inputs of NAND gates 25 and 26 are connected to the output of the timer 22 via a NAND gate connected as an inverter. The outputs of 25 and 26 are connected to a one bit memory latch 27. The output of latch 27 is connected to a disable input of ringer circuit 7. The output of NAND gate 26 is further provided to the input of automatic reset circuit 10 which is also a one shot device. The output of one shot device 10 is connected to the reset input of timer 22, as well as the respective reset inputs of the code access controller 8 and code storage registers 4 as shown in FIG. 4. The output of NAND gate 29 is further connected via an inverter to a solenoid K1 and LED 28 via a transistor switch.

Figure 4:
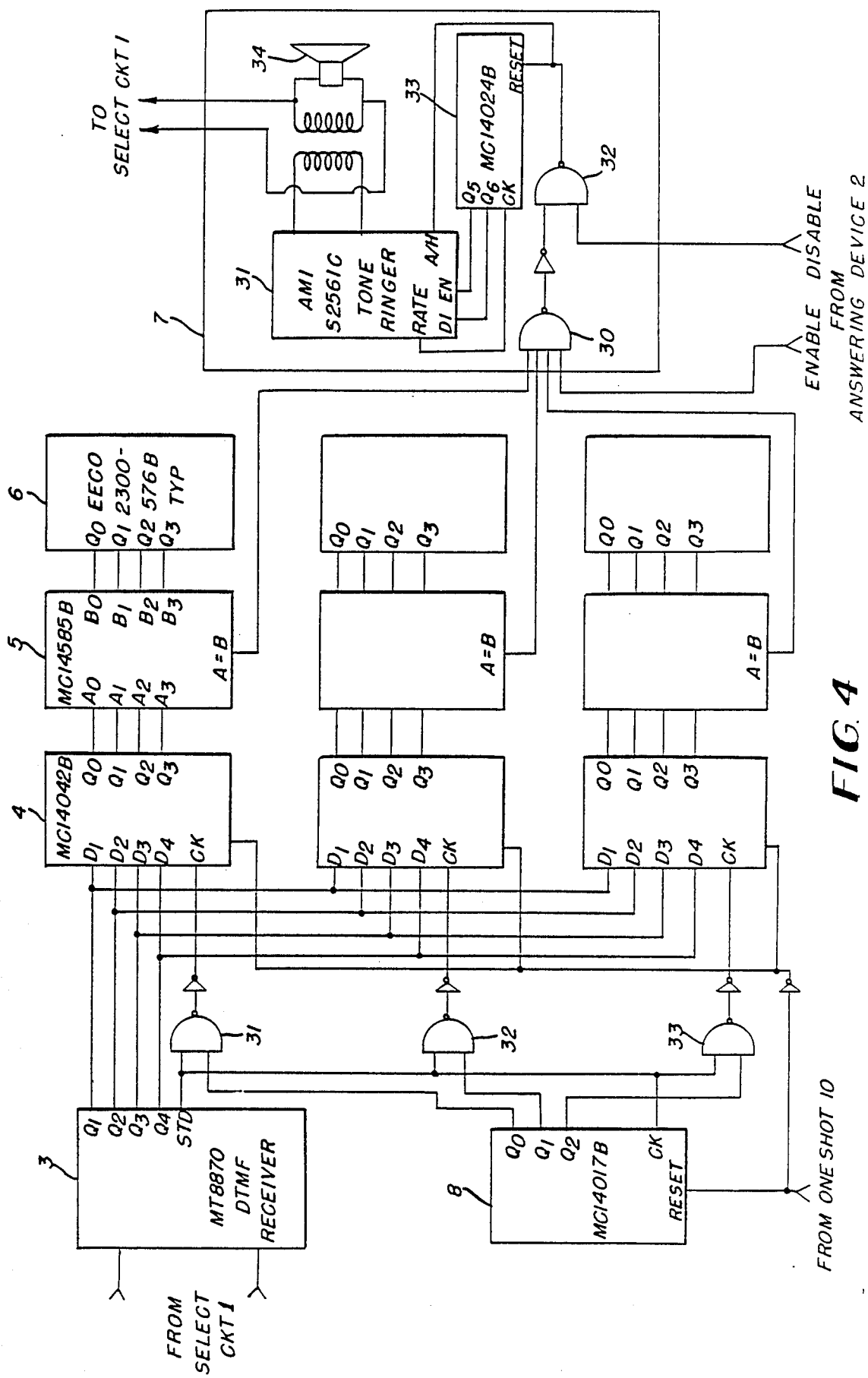
FIG. 4 is a simplified schematic diagram of the tone decoder DTMF receiver 3, digital comparator 5, and electronic ringer circuit 7 also of FIG. 1.

Referring now to FIG. 4, DTMF receiver 3 is connected to the telephone line via the mode select circuit 1. The outputs Q1 to Q4 of receiver 3 are simultaneously connected to inputs D1 to D4 of three code storage registers 4. The Q0 to Q3 outputs of code registers 4 are input to the A0 to A3 inputs of digital magnitude comparators 5. The B0 to B3 inputs of digital comparators 5 are connected to the Q0 to Q3 outputs of code selectors 6 which have been reprogrammed by a subscriber to output specific binary coded decimal values. The respective A=B outputs of the digital comparators 5 are connected to the input of four input NAND gate 30 located within ringer circuit 7. The STD output of DTMF receiver 3 is simultaneously connected to one input of NAND gates 31 to 33 and the clock input of code access controller 8, which is a decimal counter.

DESCRIPTION OF OPERATION

The operation of the system will now be described with reference to FIGS. 2-4.

Assuming that switch S1 is in the code position so that the answering device 2 is connected to the phone line, as the AC ring signal of an incoming call is detected by voltage converter 20 and converted to a square wave signal, the AC ring signal is detected by 7 bit binary counter 21 which counts the periods of the low-frequency ring signal. When a predetermined count is reached by counter 21, counter 21 provides an enable signal to 555 timer 22 to trigger the timer. Since the square wave of the AC ring signal is also fed to the one shot device 23, the output of the one-shot will disable NAND gate 29 until the end of a ring burst. As soon as the ring burst is ended, the one shot 23 will enable NAND gate 29 to turn on the relay K1 as well as LED 28, which indicates the presence of an incoming call. As relay K1 is activated, relay contacts K1a and K1b of the select circuit of FIG. 2 are closed. Relay contacts K1a and K1b function to respectively place resistor R1 as a load across the phone line to indicate to the central telephone office ringer that the incoming call has been acknowledged, and to connect the phone line to the inputs of DTMF receiver 3 as well as to phone set 11. The output of NAND gate 29 is also connected to a fourth input of NAND gate 30 of the ringer circuit 7 in order to enable the ringer circuit.

If no further action occurs, the line will stay acknowledged for about 75 seconds until the timer 22 times out and releases the line by deactivating the relay K1.

However, if the calling party is aware of this system and enters a three digit code which will be detected by the DTMF receiver 3, the communication can be established by turning on the internal electronic ringer 7. The DTMF frequency of a digit activated by the caller is detected by receiver 3 which outputs a BCD signal on outputs Q1 to Q4. The STD output of the receiver 3 goes to a high logic level when there exists any valid code number present at outputs Q1 to Q4. The STD output is the controlling signal for the code access controller 8. The outputs Q1 to Q4 are enabled only for the duration of a tone at the inputs of the DTMF receiver. Each time a tone is detected, code access controller 8 will count the presence of the tone and enable a respective output Q0 to Q2 which will selectively enable one of the code storage registers 4 to receive the BCD output from DTMF receiver 3. The code storage registers 4 are three-digit digital latch registers which provide temporary storage of the incoming code numbers. The digital magnitude comparators 5 have two BCD inputs, one of which is connected to a respective code storage register 4, and the other of which is connected to a respective code selector 6 which has been preset by the subscriber to output a particular BCD value. Whenever the digit input by the caller equals the respective digit preset by the subscriber in the code selector 6, the A=B output of the respective digital magnitude comparator 5 goes to a logic high level. When all three A=B outputs go to a logic high level, NAND gate 30 activates the tone ringer 31 of ringer circuit 7.

Whenever the resistor R1 is connected across the telephone line, comparator 24 will detect the resultant decrease in voltage drop across the telephone line and provide a signal to NAND gate 25 which in turn provides a signal to the disable input of NAND gate 32 in order to allow tone ringer 31 to be activated by an appropriate output signal from NAND gate 30 via binary counter 33. If a subscriber does not pick up the phone before timer 22 times out, the ringer will be stopped and the phone line released. If the phone set 11 is picked up by a subscriber within the predetermined period, off-hook detector 9 will detect the resultant further voltage drop across the phone line and output a signal to NAND gate 26 which will disable ringer circuit 7 by an appropriate signal to NAND gate 32. The output of NAND gate 26 is further provided via an inverter to the override input of timer 22 to maintain the timer in an on state thus preventing the timer from timing out during the continuation of a conversation. The ring signal of tone ringer 31 is provided to a speaker 34 and is also fed back to the calling party via the phone line to indicate that the subscriber's phone is now ringing.

After the conversation has been ended and the subscriber puts down the phone, the off-hook detector 9 senses the resultant increase in voltage drop across the line and switches its output to NAND gate 26. This transition is detected by the automatic reset circuit 10 which immediately applies a momentary pulse to the reset input of timer 22 thereby shutting off the timer and deactivating relay K1 in order to release the line. The output of the reset device 10 is also connected to the reset input of the code access controller 8 which functions to reset the controller 8 and is also connected to respective reset inputs of code storage registers 4 which functions to input invalid code numbers into these registers in order to preclude the detection of a valid code from a previous call upon the reception of the next succeeding call.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for selectively receiving incoming telephone calls over a telephone line comprising:
    tone decoder means, responsive to an incoming tone pulse present on the telephone line, for outputting a binary coded decimal value corresponding to the frequency of the incoming tone pulse;
    code register means, responsive to said decoder means, for sequentially storing a plurality of binary coded decimal values outputted by said decoder means;
    code selector means for sequentially storing a plurality of binary coded decimal values input by a subscriber;
    comparator means, responsive to said code register means and said code selector means, for comparing the binary coded decimal values stored by said code register means and code selector means and for providing an output signal when said respectively stored values are equal;
    ringer means, responsive to said output signal from said comparator means, for alerting a subscriber of the presence of an authorized incoming call;
    off-hook detector means, responsive to the presentation of a telephone handset load to said telephone line, for disabling said ringer means upon the connection of said handset load to said line;
    call detector means, responsive to the presence of an incoming call, for enabling said tone decoder means and said ringer means by outputting an enable signal; and
    mode selector means for connection said call detector means to said telephone line in a privacy mode and connecting said telephone handset of said telephone line in a normal mode, said mode selector means including first and second relay switches operable in said privacy mode for sequentially connecting said tone decoder means to said telephone line in conjunction with a simulated handset load to acknowledge the presence of an incoming call, and connecting said telephone handset to said telephone line to allow a subscriber to answer an authorized call when alerted by said ringer means, said first and second relay switches being activated in response to said enable signal from said call detector means.

2. The system of claim 1, wherein said call detector means comprises timer means for producing said enable signal and for disabling said tone decoder means and said ringer means after a predetermined period during which said handset presents no load to said telephone lie by terminating said enable signal.

3. The system of claim 2, wherein said timer means further disables said simulated handset load after said predetermined period during which said handset presents no load to said telephone line by terminating said enable signal.

4. The system of claim 1, wherein said tone decoder means comprises a dual tone multifrequency (DTMF) receiver.

5. The system of claim 1, wherein said call detector means includes means for detecting an incoming telephone call regardless of the polarity of the phone line connection to the system.

6. A system for selectively receiving incoming telephone calls over a telephone line, comprising:
    tone decoder means directly coupled to said telephone line and responsive to a tone pulse dialed by a caller having accessed said telephone line, for outputting a binary coded decimal value corresponding to the frequency of the dialed tone;
    code register means, responsive to said decoder means, for sequentially storing a plurality of binary coded decimal values outputted by said decoder means;
    code selector means for sequentially storing a plurality of binary coded decimal values input by a subscriber;
    comparator means, responsive to said code register means and said code selector means, for comparing the binary coded decimal values stored therein and providing an output signal when respectively stored values are equal;
    ringer means, responsive to said output signal from said comparator means, for alerting a subscriber of the presence of an authorized incoming call;
    off-hook detector means, responsive to the presentation of a telephone handset load to said telephone line, for disabling said ringer means upon the connection of said handset load to said telephone line;

call detector means, responsive to the presence of an incoming call, for enabling said tone decoder means and said ringer means, including, voltage converter means for detecting an AC ring signal on said telephone line and converting said AC ring signal to a squarewave signal, binary counter means for counting a preselected number of pulses from said squarewave signal and producing a counter signal when said preselected number has been counted, and timer means responsive to said counter signal for providing an enable signal to enable said tone decoder means to be coupled to said telephone line; and mode selector means for connecting said call detector means to said telephone line and responsive to said enable signal for connecting said telephone handset to said telephone line in a code mode, and connecting said telephone handset to said telephone line in a normal mode to allow all incoming calls to be answered.

7. The system of claim 6 further comprising means for presenting a simulated handset load to said telephone line in response to said enable signal.

8. The system of claim 7, wherein said timer means further disables said simulated handset load after said predetermined period during which said handset presents no load to said telephone line by terminating said enable signal.

9. The system of claim 6, wherein said toner decoder means comprises a dual tone multifrequency (DTMF) receiver.

10. The system of claim 6, wherein said call detector means includes means for detecting an incoming telephone call regardless of the polarity of the phone line connection to the system.

* * * * *